April 9, 1968     H. P. NEPTUNE     3,376,954

WHEEL BRAKE FOR SHOPPING CARTS

Filed Jan. 23, 1967

INVENTOR,
HERMAN P. NEPTUNE
BY
ATTORNEY

United States Patent Office 3,376,954
Patented Apr. 9, 1968

3,376,954
WHEEL BRAKE FOR SHOPPING CARTS
Herman P. Neptune, 2204 Moreno Drive,
Los Angeles, Calif. 90039
Filed Jan. 23, 1967, Ser. No. 611,069
5 Claims. (Cl. 188—69)

ABSTRACT OF THE DISCLOSURE

The brake of the present invention is primarily for wheeled shopping carts and other wheeled members wherein one of the wheels may be positively braked against rotation, or released by means adjacent the shopping cart handle. The apparatus comprises a pair of spring arms the ends of which are passed through opposed holes in the wheel framing for frictional engagement with the wheel or for reception within openings within the wheel, the framing holding the ends of the spring arms against side movement so that the wheel is positively locked against rotation.

An object of the invention is to provide a positive brake for a shopping cart wheel of simple character, inexpensive in cost of manufacture and easily adapted to existing shopping carts, as well as incorporation in new shopping carts.

A further object is the provision of a braking means for a wheel of a shopping cart, which wheel may be of the caster type or held stationary in a straight line in the shopping cart frame.

A further object is the provision of a brake for a wheel of a shopping cart wherein the brake may be released by means placed adjacent the shopping cart handle or in the alternative the braking means may be actuated by the foot by the user of the shopping cart.

Although the brake of the invention is designed primarily for shopping carts as used in super markets, etc., it can be adapted for use on many types of wheels which are used on hospital beds, baby carriages, luggage carts, rolling scaffolds, typewriter tables, hand trucks, etc.

Other objects and advantages of the invention will appear as the specification proceeds.

Figure 1:
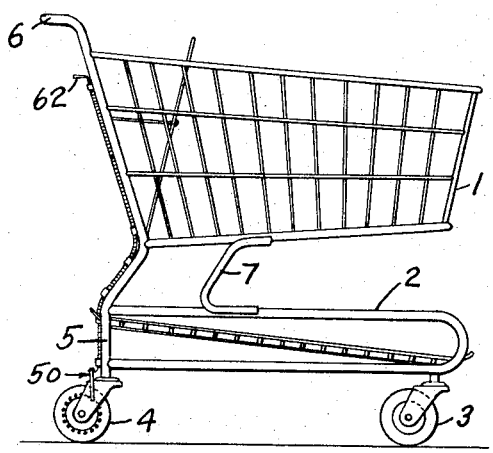
FIGURE 1 is a side elevation of a shopping cart incorporating the invention.
Figure 4:
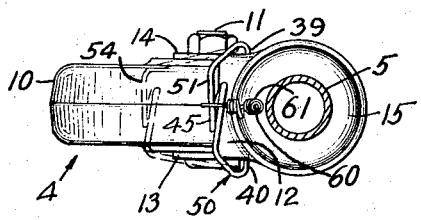
FIGURE 4 is a fragmentary, cross sectional view, taken on the line 4—4 of FIGURE 2.

Referring to the drawing, in FIGURE 1 I have shown a shopping cart of the usual form which includes a basket 1 mounted above a frame support 2, the frame provided with front and rear wheels which are usually in pairs, the front wheels 3 in the present instance being of the caster type while one of the rear wheels 4 is fixed to the frame 2 so as not to caster. The wheels 4 are mounted to the frame 2 which includes a pair of leg supports 5 terminating in a connecting handle 6. As is common practice, the basket 1 is supported by means 7 between the basket base and the frame 2.

Figure 7:
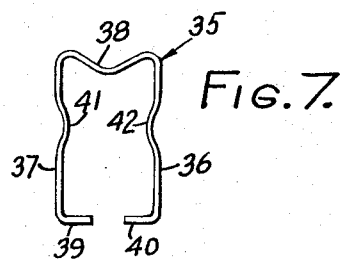
FIGURE 7 is an elevation of one form of means for braking a wheel.

The present invention relates specifically to the means for braking one of the rear wheels 4; to wit, the non-castering wheel. Usually shopping carts are held against movement by elevating the shopping cart and providing a chuck means for holding the wheel elevated. The present invention provides a device which stops wheel rotation without lifting the cart which is sometimes difficult because of the weight of the merchandise in the basket and stops wheel rotation easily and simply without lifting the cart. Several adaptations of the invention are shown in the several figures. Thus, in FIGURES 2 and 3 the non-castering wheel 4 is provided with a rubber tire 10 having an axle 11 and a framing 12 having side cheeks 13 and 14 between which is mounted the axle 11 for the wheel 4. Usually the wheel 4 has a metal hub portion for the axle 11. The side cheeks 13 and 14 merge with a table or horizontal portion 15 joining the cheeks and which table portion in turn carries a pin or stud 16 for mounting in the lower end of the leg 5 of the shopping cart. In the construction shown in FIGURES 2 and 3, the wheel does not caster or swivel. However, the wheel on the opposite side from the wheel 4, as shown in FIGURE 1, may swivel or not, the pin being allowed to turn within the leg 5. When the brake construction is not hand operated from adjacent the handle 6, the wheel of FIGURES 2 and 3 may swivel as hereinafter set forth. The tire 10 of the wheel 4 may have imbedded in each side thereof annular disks 20 and 21 and the disks and the tire on each side thereof may be provided with aligned bores, as shown at 22 and 23 for one tire side and 24 and 25 for the opposite tire side. The bores 22 and 25 are of the blind type; that is, extend partly into the tire. The side cheeks 13 and 14 are likewise transversely bored at 26 and 27, which bores are in axial alignment with the bores in the disks 20 and 21 and in the tire. The means for braking the wheel against rotation is positive in its action in that the said means enters through the aligned bores in both the tire, the disks and the cheeks of the framing to lock the wheel against any rotation relative to the framing. One form of the means for accomplishing this function is shown in FIGURE 7 wherein the means for braking 35 comprises a pair of legs 36 and 37 joined by a transverse section 38, the legs terminating in two inwardly directed and axially aligned portions or feet 39 and 40. The legs 36 and 37 have inwardly bowed portions 41 and 42. The means just described may be formed from spring wire of a stiffness which permits the same to perform a braking operation.

In FIGURE 7 it will be observed that the legs 36 and 37 are substantially parallel and that the piece 38 joining the said legs is bowed inwardly between the legs. The legs 36 and 37 are adapted to be separated so as to separate the feet 39 and 40.

Figure 2:
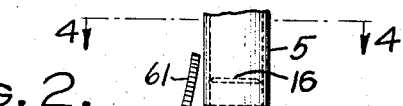
FIGURE 2 is a fragmentary side elevation on an enlarged scale, of one of the wheels of a shopping cart with brake mechanism thereof.
Figure 3:
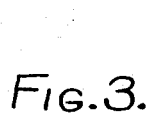
FIGURE 3 is a fragmentary front elevation of the brake mechanism and wheel shown in FIGURE 2, and looking in the direction of the arrow 3 of FIGURE 2.
Figure 9:
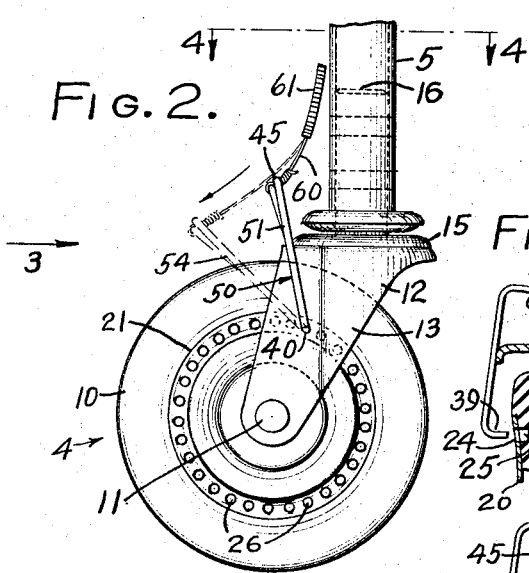
FIGURE 9 is a fragmentary sectional view showing a modified form of wheel construction for use with braking means of the type shown in FIGURE 8, the braking means being out of engagement with the wheel.

The construction of the modified means for braking a wheel shown in FIGURES 3 to 9 inclusive, constitutes a loop 45 intermediate the legs in place of the bowed portions shown for the top piece 38, and in said remaining figures the inwardly directed concave portion or bowed portions at 41 and 42 is not used. Referring to FIGURE 3, the looped construction for the brake means is designated as 50 and it will be observed that the legs are separated by the framing 12 which acts to cam the legs apart when the braking means is moved to the position shown in FIGURE 2 at 51. In this connection, the inwardly and opposed bowed portions 41 and 42 of the legs engage the cheeks when the legs are moved from the position 54 to position 51 of FIGURE 2. When so moved, the ends 39 and 40 are withdrawn from the holes in the disks and in the tire, as shown in FIGURE 3. The ends 39 and 40 are retained in the position shown within the bores 25 and 26. When the means shown at 50 is moved from the full line position of FIGURE 2 to the dotted line position thereof at 54, the legs, due to resilience and due to a loop at 45, are moved to position the foot portions 39 and 40 inwardly into the holes in both the disks and the tire. In the construction shown in FIGURES 2 to 9 inclusive, the loop end 50 holds the legs slightly divergent which divergence is increased when position 51 is reached. The braking means may be moved in two manners; one manually by the hand by means for raising or lowering or swinging the braking means, or by the foot in the absence of said hand operated braking means. Thus, in FIGURES 1, 2 and 3, a cable which may include the wire 60, sheath 61, is brought to a position below the shopping cart handle 6 by attachment of the cable to the leg 5. The wire is attached to a finger 62 which when pulled will remove the braking means in the position of 54 in FIGURE 2 to that indicated at 51 and whereby the legs straddle the wheel framing and separate or move outwardly to the position of FIGURE 3 to release the feet or ends 39 and 40 from the holes in the wheel disks and the tire as shown. If braking is then desired, the trigger or finger piece 62 is moved downwardly which swings the braking means from the full line position at 51 to the dotted line position 54. It is important to note that both the wheel tire and its disks are provided with an annular series of transverse bores or holes, the bores being in spaced relationship as shown in FIGURE 2. Hence, at practically any turning position of the wheel, the wheel may be braked.

Figure 8:
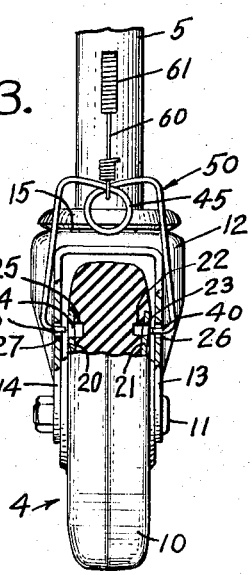
FIGURE 8 is a fragmentary sectional view of means for braking a wheel, shown out of engagement with the tire of said wheel.
Figures 5, 6:
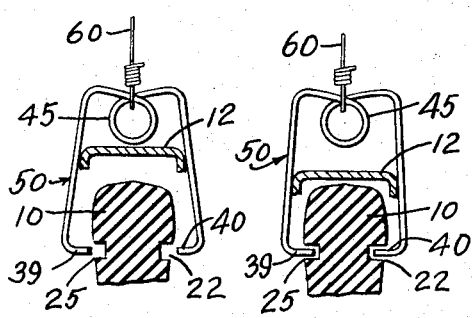
FIGURE 5 is a fragmentary sectional view of the braking means, and a portion of the tire of the wheel to be braked.
FIGURE 6 is a moved position from FIGURE 5, the wheel being braked.

The position of the braking means relative to the tire of the wheel and the framing therefor is substantially the same as that shown in FIGURE 3 with the exception that the hand operated means for moving the braking means is not used and the braking means may be moved by the hand or foot. FIGURE 8 differs from the other constructions in that the tire of the wheel is not provided with side disks nor with holes for reception of the foot portions of the braking means but said portions impale opposite sides of the tire. The foot portions may be bent so that the foot portions frictionally engage the sides of the tire instead of impaling the same. In this case the spring legs should be stiff enough to act as a friction brake against the sides of the tire. FIGURES 5 and 6 show two positions of the braking means, one locked and one unlocked and specifically the tire in each instance is not provided with side disks but the tire is provided with a preformed series of annular bores in spaced apart relationship.

The operation, uses and advantages of the invention are as follows.

By use of a spring braking means of the character shown in the several figures, it is possible to adapt the present invention to existing shopping carts by providing the wheel frame with transverse bores in opposed relationship for the purpose of receiving the opposed ends of the braking means for impingement with the wheel tire and the braking means may be actuated by the additional application of the hand means for actuating the braking means by means of a cable; or the means may be operated by swinging the same from the position of FIGURE 2 wherein the braking means is inoperative to the position shown in dotted lines at 54 while the braking means due to its resilience moves inwardly against the sides of the tire and thus stops rotation of the wheel.

In new adaptations of the invention the wheel may be provided with reinforcing disks on opposite sides thereof, which disks together with the tire are transversely bored to provide an annular series of transverse bores in spaced relationship as shown in FIGURE 2. This method is preferred as it assists the tire in stopping wheel rotation without tearing the tire by engagement with the braking means.

In FIGURE 7 the inwardly bowed or convex portions 41 and 42 engage the cheeks of the wheel framing and separate the legs in order that the contact area between the braking means and the cheeks or sides of the framing 12 may cam the legs apart. Thus, while the separation between the cheeks is uniform from the horizontal portion 15 to the axle portion 11, the framing has a fixed point for receiving the foot portions 39 and 40. The legs, however, engage the cheeks at variable radial distances and as the legs are slightly divergent, the divergency is increased when the braking means is moved from position 54 to position 51.

It is obvious that when in the scope of the invention that a solid wheel may be utilized which has a tread portion for contact with the ground or other foundation and that the wheels shown in the several views of the drawing may have the tire portion as well as the hub portion integrally formed which in the showing of the drawing would usually be followed. I do not wish to be confined to a hub and a tire carried by the hub as separate entities.

I claim:

1. A cart or similar article having supporting wheels at least one of which wheels has a tire and a framing bridging sides of said one wheel and an axle for said wheel carried by the framing, said wheel having a brake means, including: a pair of spring legs secured together at one end and bridging sides of said wheel framing, ends of said legs being inwardly directed in spaced apart axial relationship, said wheel framing sides adapted to transversely receive the inwardly directed ends of the legs for swinging movement of said spring legs, said inwardly directed ends engaging the sides of the wheel tire to stop rotation of the wheel when the legs are in one position relative to the framing, and movement of said spring legs to a second position camming the legs apart by engagement with sides of the framing to release said inwardly directed ends from wheel tire engagement.

2. The device as set forth in claim 1, characterized in: the tire of said wheel being formed with an annular series of blind bores for receiving the inwardly directed ends of said legs.

3. The device as set forth in claim 1, and means carried by the cart and connected with the braking means for revolving the braking means into braking and unbraking engagement with said wheel.

4. A wheel brake for carts and the like wherein there are wheels to support the cart and each wheel has an axle, there being framing straddling each wheel and secured to the axle and said framing being secured to the cart to support the same, one of said wheels provided with disks on both sides thereof concentric with the axle and each disk provided with an annular series of transverse bores, the wheel brake comprising a pair of separated spring legs joined together by a connecting piece at one end of the legs, the opposite ends of said legs being provided with inwardly directed portions in separated axial alignment, said wheel framing including two cheek members secured to the axle of the wheel and a connecting piece joining the cheeks and each cheek provided with a transverse bore in alignment with the bores of each disk, the inturned ends of the braking means being received in the transverse bores of the framing cheeks and said legs separating divergently as the braking means is moved to one position relative to the framing to a second position to move the inturned ends thereof into or out of engagement with the holes of said disks.

5. The device as set forth in claim 4, the connecting piece for said spring legs comprising a spring loop portion whereby the legs are caused to converge.

References Cited

UNITED STATES PATENTS 1,709,527   4/1929   Ford _____ 188—20
1,872,146   8/1932   Jackson _____ 188—167 X

FOREIGN PATENTS 456,161   11/1936   Great Britain.

MILTON BUCHLER, *Primary Examiner.*

G. E. HALVOSA, *Assistant Examiner.*